Sept. 24, 1963  W. H. PEET  3,104,616
PRESSURE LOADED GEAR PUMP
Filed Aug. 14, 1961  3 Sheets-Sheet 1

INVENTOR
WILLIAM H. PEET
BY J. P. Wiessler
ATTORNEY

Sept. 24, 1963     W. H. PEET     3,104,616
PRESSURE LOADED GEAR PUMP
Filed Aug. 14, 1961     3 Sheets-Sheet 2

INVENTOR.
WILLIAM H. PEET
BY
ATTORNEY

Sept. 24, 1963 W. H. PEET 3,104,616
PRESSURE LOADED GEAR PUMP
Filed Aug. 14, 1961 3 Sheets-Sheet 3
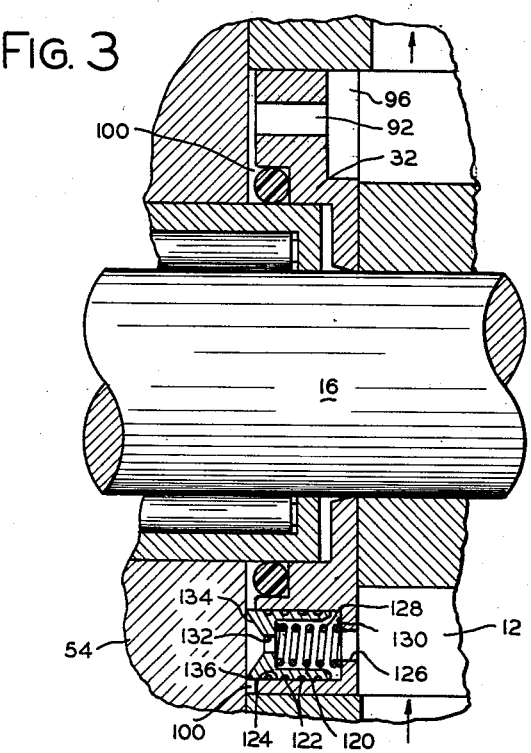
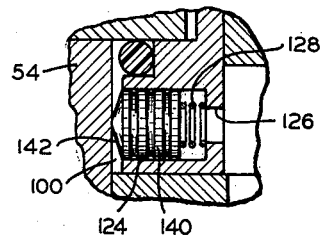
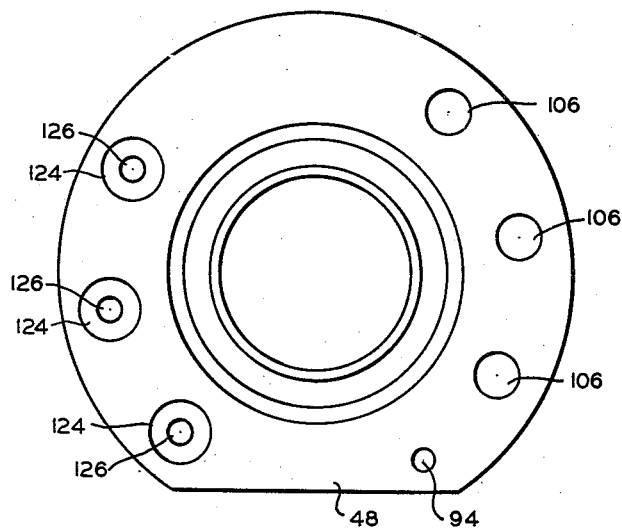
INVENTOR
WILLIAM H. PEET
BY J.C. Wiessler
ATTORNEY United States Patent Office 3,104,616
Patented Sept. 24, 1963

3,104,616
PRESSURE LOADED GEAR PUMP
William H. Peet, Ann Arbor, Mich., assignor to Clark Equipment Company, a corporation of Michigan
Filed Aug. 14, 1961, Ser. No. 131,374
11 Claims. (Cl. 103—126)

This invention relates to pressure loaded gear pumps, and more particularly to an improved construction for balancing thrust plates in such pumps.

In a pressure loaded, intermeshing gear pump having one or more sets of axially movable, pressure loadable thrust plates, discharge pressure of the pump is commonly applied to the rear or motive surface of the thrust plates to urge them into sealing engagement with their associated gears. Ordinarily in such gear pumps the motive surfaces of the thrust plates to which discharge pressure is directed will be substantially uniformly subjected to such pressure over the entire plate area. However, the forward sealing or gear side engaging surface of each thrust plate is subjected to a pressure gradient which varies from inlet pressure in the area adjacent the pump inlet to discharge pressure in the area adjacent the discharge side of the pump. Therefore, the portion of the thrust plate sealing surface near the pump inlet is subject to less pressure tending to break the seal than the portion of such surface near the pump outlet. This unbalanced pressure condition tends to twist the thrust plates and results in uneven wear of pump parts and increases the power required to turn the pump. Wear is concentrated in the area of the pump where the thrust plates tend to twist against the side faces of the adjacent gears, which imposes an excessive axial loading on the side faces of the gears in the region of the pump inlet.

"Inlet pressure side," as used herein, refers generally to that portion of the pump which is subject to inlet pressure or substantially inlet pressure. By way of example only, in the pump shown in FIGURE 2 the approximate plane of division between the inlet and discharge pressure sides is represented by the broken line ABCDE. The discharge pressure side is approximately that portion of the pump to the right of the plane of line ABCDE and the inlet pressure side is approximately that portion to the left of the plane of said line.

The present invention provides an improved construction wherein this pressure gradient is compensated for by providing each thrust plate with one or more spaced openings in the side of the thrust plate which is subjected to a relatively high pressure differential and mounting in these openings one or more piston members which are thrust into sealing relationship with a pump housing member on the motive surface side of the thrust plate. These piston members may be variously constructed and function to effectively subtract a predetermined area from that side of the thrust plate which is subjected to relatively high pressure differential. Thus, with a given number of openings provided as aforesaid in a gear pump thrust plate, a manufacturer may, by means of this invention, readily compensate for the aforementioned undesirable pressure gradient by selecting one or a combination of piston elements which subtract an effective area from the thrust plate such that the tendency of said pressure gradient to twist the thrust plate as aforesaid is minimized or eliminated entirely.

The present invention avoids difficult manufacturing problems and relatively high manufacturing costs which are inherent in prior constructions utilizing arrangements such as eccentrically disposed thrust plates, resilient seal members for restricting the area exposed to discharge pressure at the back of the thrust plate, and relatively complex and expensive piston constructions for applying additional sealing force to the side of the thrust plate on the discharge side of the pump or reducing the sealing force of the thrust plate on the inlet side of the pump.

Accordingly, it is the primary object of the present invention to provide in a pressure loaded type gear pump, improved means for balancing the movable thrust plates of such pumps.

It is another object of the invention to provide an improved piston-like sealing construction for use with thrust plates of pressure loaded gear pumps.

A further object of the invention is to provide in pumps of the type specified a plurality of piston means differing in construction which are adapted to be selectively associated with the thrust plate of such pumps for minimizing the effect of the unbalance of forces which normally act on such thrust plates in operation.

Other objects and advantages of the present invention will be apparent from the following detailed description taken in conjunction with the drawings wherein:

FIGURE 3 is a broken-away, enlarged sectional view taken along line 3—3 of FIGURE 2;

FIGURE 5 is a view in elevation of the motive surface side of the thrust plate;

FIGURE 6 is a broken-away, partial view of FIGURE 3 showing a modification of the piston element illustrated in FIGURE 3.

Figure 1:
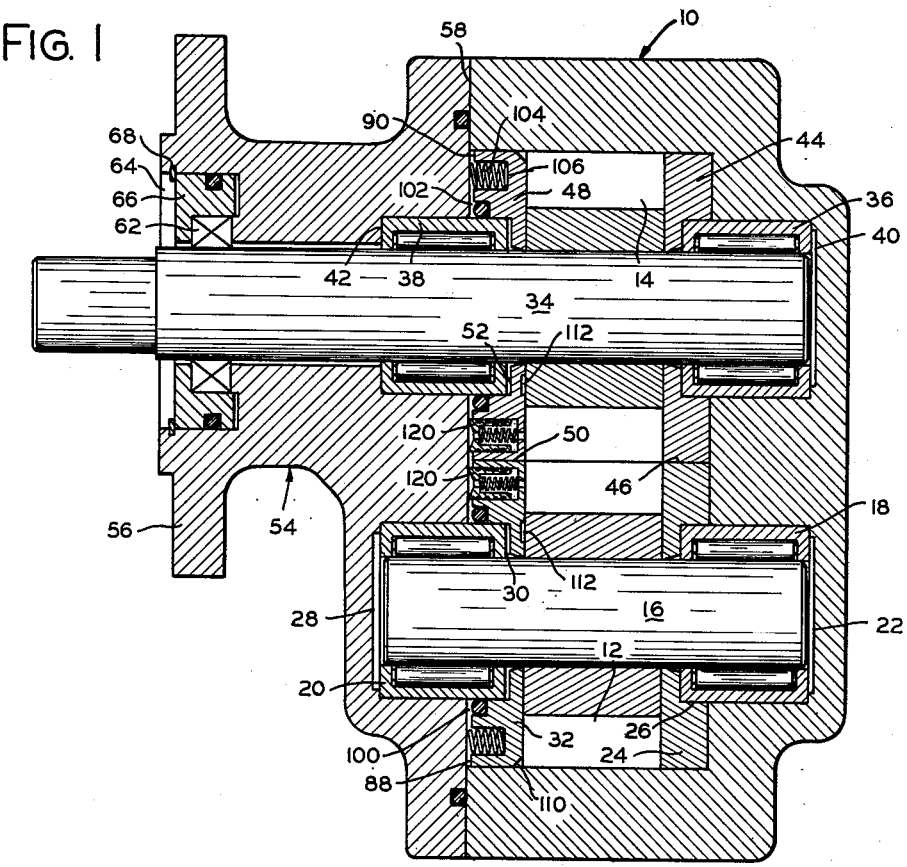
FIGURE 1 is a sectional view of a pressure loaded type, intermeshing gear pump taken along line 1—1 of FIGURE 2.

Referring now in detail to the drawing, the numeral 10 denotes a suitably chambered gear pump housing in which are rotatably mounted a driven gear 12 and an intermeshing driving gear 14. Driven gear 12 is supported on a shaft 16 journaled on its right side in a roller bearing 18 and on its left side in a roller bearing 20. Roller bearing 18 is located in a chamber 22 formed in the pump housing and is maintained in position by a fixed thrust plate 24 located intermediate bearing 18 and gear 12 and providing an annular recess 26 in registry with the left end portion of the bearing. The bearing member 20 is located in a housing chamber 28 and is located in registry with an annular recess portion 30 of an axially movable or floating disc-shaped thrust plate 32 intermediate said bearing and the one side face of gear 12.

Driving gear 14 is mounted for rotation upon a drive shaft 34 journaled on its right side in a roller bearing 36 and intermediate its ends in a roller bearing 38, said roller bearings being mounted in chambers 40 and 42, respectively, in a manner similar to the mounting of bearings 18 and 20. A fixed thrust plate 44 is mounted intermediate gear 14 and bearing 36 in a manner similar to the mounting of thrust plate 24, said plates 24 and 44 mating in sealing relationship along complementary flat surfaces thereof indicated at numeral 46. An axially movable or floating disc-shaped thrust plate 48 is mounted intermediate gear 14 and bearing 38 in a manner similar to the mounting of movable thrust plate 32, said movable thrust plates abutting in sealing relationship along complementary flat surfaces thereof as indicated at numeral 50. A recess 52 is formed in thrust plate 48 and receives one end portion of bearing 38. The construction of thrust plates 32 and 48 will be described in detail hereinafter.

A cover body 54 having an adaptor connecting flange 56 and a mating surface 58 is secured to the pump body 10 by means of a plurality of bolts, not shown, adapted to be received in threaded openings 60 in pump body 10.

A shaft seal 62 is located in an enlarged chamber 64 of cover body 54 between a seal retainer member 66 and a portion of the cover body 54. A snap ring 68 locates seal retainer 66 in chamber 64. A plurality of O-rings are mounted in annular grooves formed in various parts of the pump construction, as shown, to provide sealing means as required to prevent leakage of pressure fluid.

Figure 2:
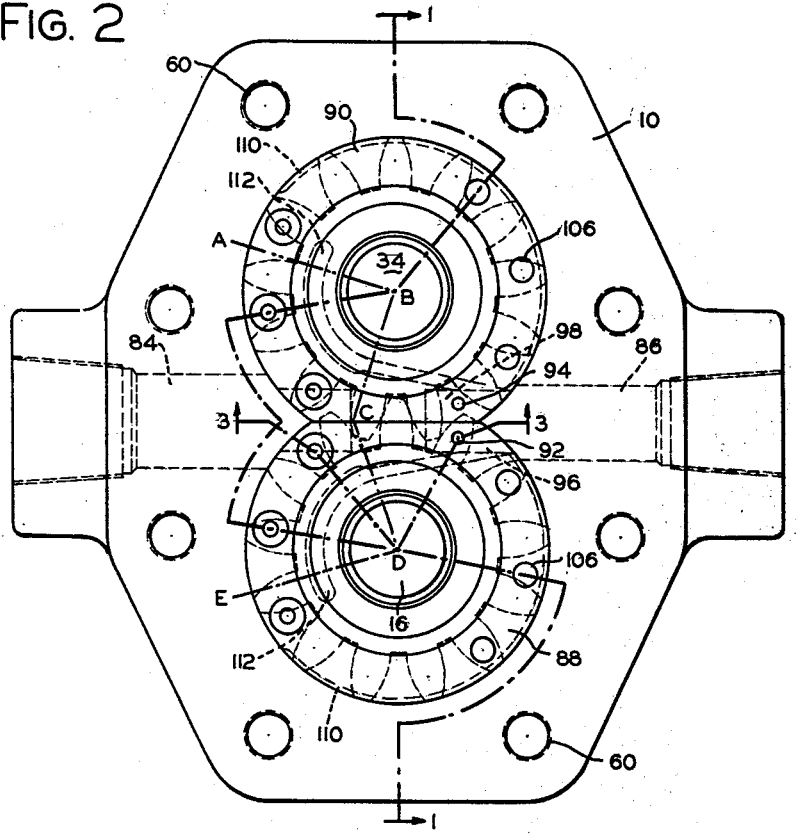
FIGURE 2 is an elevational view of the pump taken from the left end of FIGURE 1 with the cover body removed.

As shown in FIGURE 2, the pump body 10 has an inlet conduit 84 formed in its left side and an outlet conduit 86 formed in its right side. Pressure generated by the gears is communicated from the outlet or discharge side of the pump to rear or motive surfaces 88 and 90 of the thrust plates 32 and 48, respectively, through passages 92 and 94 in said thrust plates. The passages 92 and 94 open in recesses 96 and 98 on the discharge side of the pump, said recesses being formed in the forward or sealing side surfaces of the thrust plates 32 and 48. These recesses insure continuous communication of the passages with full discharge pressure. The discharge pressure fluid is directed through passage 92 into a pressure chamber 100 which is formed between surface 58 of cover body 54 and the motive surface of thrust plate 32, and is directed through passage 94 into a chamber 102 which is formed between the said cover body surface and the motive surface of thrust plate 48. Discharge pressure is applied uniformly in chambers 100 and 102 to maintain the forward sealing surfaces of opposed thrust plates 44 and 48 in sealing relationship with the abutting side surfaces of gear 14, and, likewise, the forward facing surfaces of thrust plates 24 and 32 are maintained in sealing relationship with the opposed side faces of gear 12. In order to provide an initial seal between the sealing surfaces of the thrust plates and the side faces of the gears, a plurality of compression springs 104 are disposed in recesses 106 formed in the peripheral portion of each of the thrust plates 32 and 48.

Figure 4:
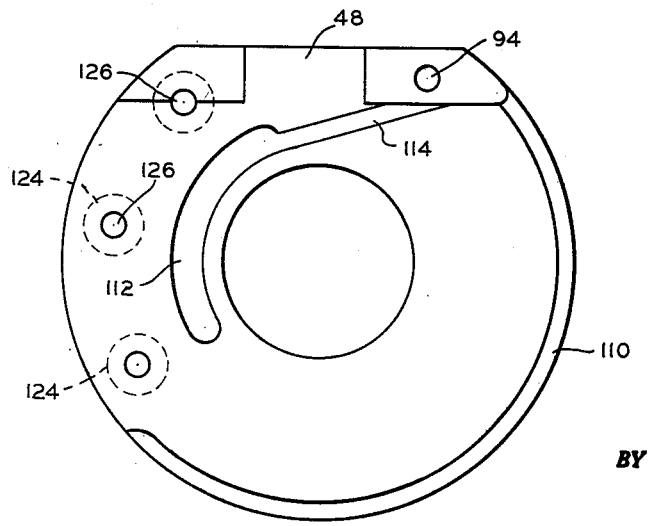
FIGURE 4 is a view in elevation of the sealing surface side of the thrust plate.

If desired, and as best shown in FIGURES 1 and 4, there may be formed in the forward sealing face of each floating thrust plate a balance groove which extends circumferentially of the forward side and radially outwardly of the root diameter of the adjacent gear, illustrated in the form of a chamfer 110 which communicates with recess 98 on the discharge side of the pump and extends circumferentially to a position short of the inlet pressure side of the pump. A second balance groove 112 may also be formed in the forward face of the thrust plate and extends circumferentially thereof on the inlet pressure side of the pump, being located radially inwardly of the root diameter of the adjacent gear. The latter balance groove communicates with recess 98 by way of groove 114. The foregoing balance groove construction, as well as the overall pump construction, is disclosed in greater detail in co-pending application Serial No. 806,566, filed April 15, 1959, in the name of John A. Lauck (common assignee), and issued as Patent No. 3,057,303 on October 9, 1962.

It will be understood that in a gear pump of the type specified, fluid at discharge pressure is communicated throughout the pressure chambers 100 and 102 between the motive surface of the thrust plate and the opposing surface of cover body 54, such pressure fluid being uniformly and continuously applied during operation of the pump to motive surfaces 88 and 90 to urge the sealing surfaces of thrust plates 32 and 48 into sealing engagement with the abutting side faces of gears 12 and 14 with substantially equal axial thrust at all points on the motive surface. However, due to the pressure gradient which extends across each thrust plate sealing surface from inlet pressure on the inlet side to discharge pressure on the discharge side, the sealing pressure differential across the inlet pressure side of the thrust plate is substantially greater than the pressure differential across the discharge pressure side.

In order to provide a properly balanced thrust plate in pump constructions wherein the pressure balance grooves 110 and 112 alone are insufficient, I have devised an improved piston-like construction which is adapted to be utilized either alone or in combination with such pressure balance grooves. As illustrated, three such piston means have been provided in association with each of the floating thrust plates, although, of course, more or less than this number may be used as required. One embodiment of my piston construction is illustrated best in FIGURE 3 wherein a hollow piston member 120 having preferably a plurality of lubricating grooves 122 formed in the periphery thereof, is mounted in one of a plurality of openings 124, each of which openings has an extension 126 in communication, as illustrated, wtih the inlet pressure side of the pump adjacent gear 12. A spring 128 is mounted in opening 124 between the one end of the piston element and a shoulder 130 of the thrust plate for urging the opposite end of the piston element into abutment with the inside surface of cover body plate 54. An opening or fluid passage 132 extends through piston element 120 and communicates with the inlet pressure side of the pump by way of openings 124 and 126. An outwardly flared end portion 134 of the piston forms a relatively sharp peripheral edge 136 at the one end thereof which is adapted to form a seal with cover body 54 as a result of the thrust of spring 128. Any leakage fluid which may flow from discharge pressure chamber 100 past said edge 136 of the piston element is vented through the openings or fluid passage means 132, 124 and 126 to inlet pressure. Thus, essentially the entire cross-sectional area of opening 124 is subtracted from the effective motive surface area of each thrust plate, and, by predetermining the particular condition of unbalance which exists in the operation of any given pump design, one or a plurality of such openings and pistons of predetermined diameter and location on the inlet pressure side of the thrust plate may be utilized to effect a properly balanced thrust plate with the advantages attendant thereon.

In certain gear pumps it may be found that a greater number of piston receiving openings are provided than are required to properly balance the thrust plate. In FIGURE 6 I have illustrated a piston element 140 which is received in opening 124 in the same manner as is piston element 120 and which utilizes a closed generally cone-shaped end 142, the apex of which is movable into abutting relation with cover body 54 by the spring 128. It will be apparent that discharge pressure fluid which is initially generated by the pump upon starting same is applied to the cone-shaped surface of piston element 140, actuating it in opposition to spring 128, whereby the effective area of the motive surface of the thrust plate in the same as would be the case if the opening 124 and piston 140 were not present. Piston 140 therefore comprises a blank element which, together with piston elements 120, may be utilized in any desired combination in a plurality of openings 124 formed in the thrust plate.

Figure 7:
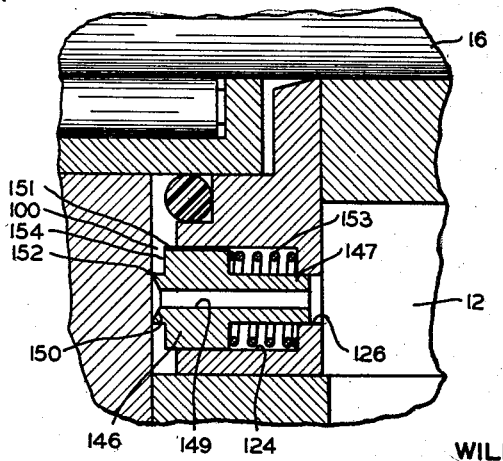
FIGURE 7 is a view similar to FIGURE 6 showing another modification of the piston element.

Moreover, it will be clear that a plurality of designs of the sealing end of the piston element can be provided so that areas which differ in size can readily be subtracted from the motive surface of a thrust plate. For example, in FIGURE 7 all parts of the pump construction are the same as in previously described figures excepting the piston element 146 which has a tublar extension 147 projecting from the one side of the piston through opening 124 and in registry with opening 126. An opening 149 extends through the piston element 146 and a cup-shaped projection 150 is formed on the other side of the piston having a relatively sharp annular sealing edge 152 which abuts the adjacent surface of cover body 54. A small longitudinal passage 151 is formed along one side of the piston to connect the chamber formed in opening 124 with chamber 100, end portion 150 being held in sealing engagement with the housing by spring 153. The diameter of opening 126 is preferably the same as the diameter of annular edge 152 so that the construction is properly balanced to effect an area subtraction from the motive surface of the thrust plate 32 which is equal to the diameter of annular edge 152 or opening 126. Piston element 146 operates in a manner similar to element 120, but provides an annular surface area 154 which is subject to the pressure in chamber 100 so that the net reduction in effective area of the motive surface side of the thrust plate is less than is effected by means of piston 120.

For the purpose of illustration section 3—3 of FIGURE 2, which comprises FIGURE 3, is taken through that piston element on thrust plate 32 which is nearest to inlet conduit 84, and, as is well-known, the inlet fluid pressure normally present in this pump area is less than zero gage pressure. Therefore, in normal operation a partial vacuum exists in this inlet area of the pump. As a result, and as previously discussed, the inlet side of the thrust plate is subjected to a differential pressure which is the highest pressure in the gradient extending from the discharge to the inlet side of the pump. Piston element (or elements) 120 functions to compensate for this pressure gradient by blanking off an area of the thrust plate which is substantially equal to the area of opening 124, so that the net thrust force acting on the thrust plate in the direction of gear 12 is reduced by an amount substantially equal to the pressure difference across the thrust plate in the area of piston element 120 times the area of opening 124. Likewise, use of piston element 146 reduces the effective sealing force acting on the thrust plate by an amount substantially equal to the pressure difference in the area of said piston element times the area enclosed by annular edge 152, while use of blank piston element 140 effects no reduction in said sealing force. The spring urging each piston element into abutment with the cover body 54 should preferably be just sufficient to maintain a seal between the cover body and the piston so that pressure fluid in the pressure chamber will not depress the piston and permit escape of pressure fluid through the piston opening. As the area of annular surface 154 is increased or decreased in pistons having different sealing end designs the area of opening 126 and of stem 147 should be correspondingly decreased or increased, respectively, so as to effect the desired reduction in the motive surface area of thrust plate 32. Any required number of piston elements having sealing end designs which vary in increments for effective thrust plate area reduction from the maximum area reduction of the FIGURE 3 construction to the substantially zero area reduction of the FIGURE 6 construction can readily be supplied. Thus, a standard thrust plate design in which only the area of opening 126 is made variable to accomodate different piston elements, may be utilized in each of a number of gear pumps, and piston elements having various thrust plate area reduction characteristics may be combined therewith in any required manner to afford a properly balanced thrust plate, thereby avoiding the problem of uneven pump wear which prematurely causes deterioration of the pump.

From the foregoing, it is believed that those skilled in the art will readily appreciate and understand the novel concept of the present invention. Although the invention has been described only in relation to a particular few embodiments, various modifications, rearrangement of parts and substitution of equivalents will be apparent to persons skilled in the art, and it is not my intention to be limited to any particular form of the invention except as may appear in the claims appended.

I claim:

1. In a pressure generating pump of the type including a housing containing intermeshing gears and having an inlet leading to and an outlet leading from said housing, an axially movable thrust plate having a sealing surface in sealing relationship with the side face of one of said gears, the side of said thrust plate opposite from said sealing surface comprising a motive surface adapted to be subjected to pump generated pressure fluid, a pump housing member forming with said motive surface a pressure chamber, means for supplying said pressure chamber with pump generated pressure fluid, an opening extending through said thrust plate from said motive surface side to said sealing surface side, piston means mounted in said opening, said piston means extending into said pressure chamber and into sealing abutment with said housing member, and fluid passage means in said piston means for venting the end of said piston means in abutment with said housing member to the inlet whereby the area of said piston is subtracted from the area of said motive surface subject to pump generated pressure fluid to counteract twisting of said thrust plate.

2. In a pressure generating pump of the type including a housing containing intermeshing gears and having an inlet leading to and an outlet leading from said housing, a floating thrust plate having a forward surface in sealing relation with a side face of the adjacent gear, the side of said thrust plate remote from the sealing surface comprising a motive surface, a cover body secured to the housing and defining with said motive surface a pressure chamber therebetween, means for communicating said pressure chamber with pump generated pressure fluid, said thrust plate being subject to such pump generated pressure fluid to maintain sealing engagement with said gear side face during operation of the pump, an opening extending through said thrust plate on the inlet pressure side of the pump, piston means mounted in said opening, means mounted in said opening for urging said piston means into sealing abutment with said cover body, and fluid passage means extending through said piston means for venting the end of said piston means abutting said cover body to the said inlet pressure side of the pump whereby the tendency of the thrust plate to twist is counteracted.

3. In a pressure generating pump of the type including a housing containing intermeshing gears and having an inlet leading to and an outlet leading from said housing, a floating thrust plate having a forward surface in sealing relation with a side face of the adjacent gear, the side of said thrust plate remote from the sealing surface comprising a motive surface, a cover body secured to the housing and defining with said motive surface a pressure chamber therebetween, means for communicating said pressure chamber with pump generated pressure, said thrust plate being subject to such pump generated pressure to maintain sealing engagement with said gear side face during operation of the pump, a plurality of openings extending in spaced relation through said thrust plate for connecting said pressure chamber to an area adjacent one of said gears, a first piston element mounted in one of said openings and extending into said pressure chamber in sealing abutment with said cover body, an opening extending through said piston element in communication with said adjacent gear area, and a second piston element mounted in a second one of said openings and adapted to be actuated inwardly of said latter opening during operation of the pump.

4. In a pressure generating pump of the type including a housing containing intermeshing gears and having an inlet leading to and an outlet leading from said housing, a floating thrust plate having a forward surface in sealing relation with a side face of the adjacent gear, the side of said thrust plate remote from the sealing surface comprising a motive surface, a cover body secured to the housing and defining with said motive surface a pressure chamber therebetween, means for communicating said pressure chamber with pump generated pressure, said thrust plate being subject to such pump generated pressure to maintain sealing engagement with said gear side face during operation of the pump, an opening extending through said thrust plate for communicating said pressure chamber with the inlet pressure side of the pump, a piston element mounted in said opening, said piston element having a sharp-edged end which is operable to abut a surface of said cover body to prevent pressure fluid in said pressure chamber from communicating with said end, and spring means mounted in said opening for extending said piston element outwardly of said opening through said pressure chamber and into sealing abutment with said surface of said body portion so that the tendency of said thrust plate to twist is opposed.

5. In a pressure generating pump of the type including a housing containing intermeshing gears and having an inlet leading to and an outlet leading from said housing, a floating thrust plate having a forward surface in sealing relation with a side face of the adjacent gear, the side of said thrust plate remote from the sealing surface comprising a motive surface, a cover body having a flat surface area defining with said motive surface a pressure chamber therebetween, means for communicating said pressure chamber with pump generated pressure, said floating thrust plate being subject to such pump generated pressure to maintain sealing engagement with the gear side face during operation of the pump, an opening extending through said thrust plate from said motive surface side to said sealing surface side, a piston element received in said opening and extending into said pressure chamber into sealing abutment with said surface of the cover body, and an opening extending through said piston element for conducting leakage fluid from said pressure chamber to the inlet side of the pump so that twisting of said thrust plate is counteracted.

6. A pump as claimed in claim 5 wherein the wall of said piston element forms a relatively sharp-edged piston end which is adapted to abut said cover body surface to prevent pressure fluid in said pressure chamber from communicating with said openings in said piston element.

7. A pump as claimed in claim 6 wherein a plurality of said piston elements having various effective areas subjected to pressure fluid in said pressure chamber are associatable successively in said thrust plate opening.

8. In a pump having a housing, fluid pressure generating means disposed in the housing and a pressure chamber in communication with pump generated pressure fluid, a thrust plate having one side biased into sealing relation with the fluid pressure generating means during pump operation by the pump generated pressure fluid in the pressure chamber, an opening extending between the sides of said thrust plate, piston means disposed in said opening, said piston means and the other side of said thrust plate defining a motive surface adjacent the pressure chamber and subject to pump generated pressure fluid, said piston means including a plurality of interchangeable piston elements having different configurations and disposable successively in said opening to vary the area of said motive surface subject to pump generated pressure fluid.

9. In a pump having a housing, fluid pressure generating means disposed in the housing and a pressure chamber in communication with pump generated pressure fluid, a thrust plate having one side biased into sealing relation with the fluid pressure generating means during pump operation by the pump generated pressure fluid in the pressure chamber, at least two openings extending between the sides of said thrust plate, piston means disposed in each of said openings, said piston means and the other side of said thrust plate defining a motive surface adjacent the pressure chamber and subject to pump generated pressure fluid, said piston means including a plurality of interchangeable piston elements having different configurations and disposable successively in either of said openings to vary the area of said motive surface subject to pump generated pressure fluid.

10. In a pump having a housing, fluid pressure generating means disposed in the housing and a pressure chamber in communication with pump generated pressure fluid, a thrust plate having one side biased into sealing relation with the fluid pressure generating means during pump operation by the pump generated pressure fluid in the pressure chamber, at least two openings extending between the sides of said thrust plate, piston means disposed in each of said openings, said piston means and the other side of said thrust plate defining a motive surface adjacent the pressure chamber and subject to pump generated pressure fluid, said piston means including a first plurality of interchangeable piston elements having different configurations and disposable successively in one of said openings to vary the area of said motive surface subject to pump generated pressure fluid and a second plurality of interchangeable piston elements having different configurations and disposable successively in the other of said openings to vary the area of said motive surface subject to pump generated pressure fluid.

11. In a pump having a housing, fluid pressure generating means disposed in the housing and a pressure chamber in communication with pump generated pressure fluid, a thrust plate having one side biased into sealing relation with the fluid pressure generating means during pump operation by the pump generated pressure fluid in the pressure chamber, at least two openings of substantially equal area extending between the sides of said thrust plate, piston means disposed in said openings, said piston means and the other side of said thrust plate defining a motive surface adjacent the pressure chamber and subject to pump generated pressure fluid, said piston means including a first piston element disposed in one of said openings and a second piston element disposed in the other of said openings, said piston elements having different configurations and defining with said thrust plate portions of said motive surface having different areas subject to pump generated pressure fluid.

References Cited in the file of this patent

UNITED STATES PATENTS

| | | |
|---|---|---|
| 2,627,232 | Lauck | Feb. 3, 1953 |
| 2,682,836 | Orr | July 6, 1954 |
| 2,758,548 | Rockwell | Aug. 14, 1956 |
| 2,816,512 | Murray | Dec. 17, 1957 |
| 2,876,705 | Aspelin et al. | Mar. 10, 1959 |
| 3,000,323 | Park et al. | Sept. 19, 1961 |
| 3,057,303 | Lauck | Oct. 9, 1962 |